United States Patent
Patitsas et al.

(10) Patent No.: US 6,231,026 B1
(45) Date of Patent: May 15, 2001

(54) TIRE CURING BLADDER CONTAINING LECITHIN AND USE THEREOF

(75) Inventors: George Philemon Patitsas, Kent; Paul Harry Sandstrom, Tallmadge; John Richard White, Wadsworth; Bharat Kanchanlal Kansupada, Mogadore, all of OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/379,040

(22) Filed: Aug. 23, 1999

(51) Int. Cl.⁷ .................................................. B29C 35/00
(52) U.S. Cl. .......................... 249/65; 156/401; 264/315; 264/326; 425/43; 425/52
(58) Field of Search ..................... 264/315, 326, 264/127, 130, 131, 501, 572; 425/35, 39, 52, 27, 43, 28.1, 45; 249/65, 117; 156/394.1, 401

(56) References Cited

U.S. PATENT DOCUMENTS

| | | | |
|---|---|---|---|
| 3,713,851 | * | 1/1973 | Cekada, Jr. . |
| 4,092,279 | * | 5/1978 | Piskoti . |
| 4,244,742 | * | 1/1981 | Huber et al. . |
| 5,580,513 | * | 12/1996 | Patitsas et al. ...................... 264/315 |
| 5,728,311 | * | 3/1998 | Patitsas et al. ...................... 264/315 |
| 5,738,813 | * | 4/1998 | Naganawa et al. .................. 264/315 |
| 5,922,379 | | 7/1999 | Wang .................................. 426/138 |

FOREIGN PATENT DOCUMENTS 0761404   3/1997   (EP) .

OTHER PUBLICATIONS

European Search Report.

* cited by examiner

*Primary Examiner*—Mathieu D. Vargot
(74) *Attorney, Agent, or Firm*—Henry C Young, Jr.

(57) ABSTRACT

The invention relates to expandable butyl rubber bladders for use in curing presses for hydrocarbon rubbers such as pneumatic tires. The bladders are a crosslinked elastomer comprising isobutylene repeat units and the bladder composition contains lecithin, particularly a modified lecithin, preferably in liquid form, dispersed within the bladder composition. The bladder composition may also contain castor oil, corn oil and/or soya-bean oil. The bladder composition may also contain at least one of graphite and polytetrafluoroethylene powder. The invention also relates to a method of curing tires by utilizing such butyl rubber bladder.

70 Claims, No Drawings

TIRE CURING BLADDER CONTAINING LECITHIN AND USE THEREOF

FIELD

The invention relates to expandable butyl rubber bladders for use in curing presses for hydrocarbon rubbers such as pneumatic tires. The bladders are a crosslinked elastomer comprising isobutylene repeat units and the bladder composition contains lecithin, particularly a modified lecithin, preferably in liquid form, dispersed within the bladder composition. The bladder composition may also contain castor oil, corn oil and/or soya-bean oil. The bladder composition may also contain at least one of graphite and polytetrafluoroethylene powder. The invention also relates to a method of curing tires by utilizing such butyl rubber bladder.

BACKGROUND

It is important for the interfacial surface of expandable tire curing bladders of a butyl rubber composition to have adequate interfacial lubricity and sufficiently low adhesion properties between the bladder surface and the inner surface of the tire being vulcanized.

Conventionally the butyl rubber composition for a tire curing bladder contains castor oil as a lubricant which tends to bleed to the outer surface of the bladder to promote a continuing lubricity at the interface between the bladder surface and inner surface of the tire being cured. For example, see U.S. Pat. No. 3,031,423.

Use of corn oil as an internal tire cure butyl rubber bladder lubricant has also been proposed. See U.S. Pat. No. 5,580,513.

Use of graphite as a lubricant (see U.S. Pat. No. 5,538,218) and polytetrafluoroethylene powder as a lubricant (see U.S. Pat. No. 5,728,311) have also been proposed for use in a butyl rubber tire curing bladder.

Even with an internal lubricant, such as castor oil or corn oil for the butyl rubber bladder composition, it is often desired to apply additional lubricant to the outer bladder surface to enhance the aforesaid interfacial lubrication such as, for example, a polysiloxane-based lubricant, a practice which is well known to those skilled in such art.

From an historical perspective, pneumatic rubber vehicle tires are produced by molding and curing a green or uncured, and unshaped tire in a molding press. The green tire is pressed outwardly against a mold surface by means of an inner fluid-expandable bladder. By this method, the green tire is shaped against the outer mold surface which defines the tire tread pattern and configuration of the sidewalls. By application of heat and pressure, the tire is molded and cured at elevated temperatures.

Historically, the expansion of the bladder is accomplished by application of internal pressure to the inner bladder cavity which is provided by a fluid such as gas, hot water and/or steam which also participates in the transfer of heat for the curing or vulcanization of the tire. The tire is then conventionally allowed to cool somewhat in the mold, sometimes aided by adding cold or cooler water to the bladder. Then the mold is opened, the bladder is collapsed by removal of its internal fluid pressure and the tire is removed from the tire mold. Such use of tire curing bladders is well known to those having skill in such art.

By such practice, it is recognized that there is substantial relative movement at the interface between the outer contacting surface of the bladder and the inner surface of the tire during the expansion phase of the bladder. Likewise, there is considerable relative movement between the outer contacting surface of the bladder and the cured inner surface of the tire during the collapse and the stripping of the bladder from the tire after the tire has been molded and vulcanized.

By such practice, it is recognized that the bladder surface can tend to stick to a tire's inner surface after the tire is cured and during the bladder collapsing part of the tire cure cycle. This adhesion may cause roughening of the bladder surface if it is not controlled. This typically reduces bladder durability and can produce defective tires.

Accordingly, it is often desired to pre-coat the bladder surface, or to pre-coat the inner surface of the green or uncured tires with a lubricant which can also transfer to the bladder surface and, thereby, provide a degree of interfacial lubricity between the outer bladder surface and inner tire surfaces during the tire's molding and curing operation. Such lubricant has sometimes been referred to as a "bladder lubricant", and can be of numerous formulations. A silicone polymer (e.g.: a polysiloxane) is often used as a bladder lubricant.

It is to be appreciated that the release of the tire from its curing bladder in an industrial manufacturing setting is intimately associated with both the phenomenon of release (to prevent sticking) and the phenomenon of lubrication (to enhance slipping) between the bladder and the adjacent tire surfaces. The release aspect refers to the basic ability to avoid adhesion, or release, and the aspect of lubrication relates to enhancing the ability of the surfaces to slip and enable a movement of the bladder with respect to the tire.

Butyl rubber is commonly used in tire curing bladders. Butyl rubber is a copolymer of predominantly isobutylene with small amounts of diene monomers usually isoprene to give sufficient unsaturation to allow the butyl rubber to be crosslinked. Halogenated copolymers of isobutylene and para-methylstyrene are also sometimes used.

Accordingly, it is desired to provide curing bladders with acceptable lubricity, decreased adhesion of the bladder to cured tires, increased flex life, and improved heat stability.

In the description of this invention the term "phr" is sometimes used to refer to "parts per hundred parts by weight of rubber" for various ingredients in a rubber composition.

The terms "compound", "compounded rubber" and "rubber composition" are intended to be interchangeable terms unless otherwise noted.

The terms "cure" and "vulcanize" are intended to be interchangeable terms unless otherwise noted.

SUMMARY OF THE INVENTION

In accordance with this invention, an expandable bladder which is a butyl rubber composition comprised of a formulated rubber composition which contains about 2 to about 10, alternatively about 3 to about 7, parts by weight, per 100 parts by weight rubbery polymers in said rubber composition, of lecithin material dispersed throughout said rubber composition selected from at least one of lecithin, acylated lecithin, hydroxylated lecithin, de-oiled lecithin, preferably an acylated lecithin, said formulated rubber composition comprising:

(a) butyl rubber as one or more isobutylene rubbery polymers, wherein said isobutylene rubbery polymers are optionally brominated, wherein said isobutylene rubbery polymers are comprised of from about 80 to about 99 weight percent repeat units from isobutylene and from 1 to abut 20 weight percent repeat units from (1) conjugated diene having from 4 to 5 carbon atoms, preferably isoprene, or (2) para-methylstyrene; and (b) one or more curatives for said rubbery isobutylene polymer(s).

Preferably said butyl rubber is a copolymer of isobutylene and isoprene which contains from about 1 to about 5 weight percent units derived from isoprene and where said curatives are polychloroprene rubber and phenol-formaldehyde resin.

Alternatively, the bladder rubber composition also contains from about 2 to about 8 phr of at least one of castor oil, corn oil and soya-bean oil; wherein the weight ratio of said oil to said lecithin material is in a range of about 0.5/1 to about 2/1.

Alternatively, the bladder rubber composition also contains from about 0.5 to about 10 phr of graphite and/or polytetrafluoroethylene powder in addition to said lecithin material.

Accordingly, therefore, a tire curing bladder is provided which is composed of a butyl rubber composition which contains a dispersion therein of lecithin in a modified, liquid form which has herein been observed to enhance lubricity (reduce coefficient of friction) and reduce adhesion of the bladder surface to a tire innerliner surface during a tire cure operation.

It is to be appreciated that it is contemplated herein that lecithin is derived from soya-bean oil.

Liquid lecithin is a naturally occurring complex mixture of phospholipids, generally acetone insoluble, which is extracted from soya-bean oil.

Acylated lecithin may be described, in general, as lecithin hydrate reacted with acetic anhydride.

In particular, for preparation of an acylated lecithin, a lecithin hydrate may be obtained from crude soya-bean oil. The lecithin hydrate may then be reacted with acetic anhydride. The product may then be treated with a dilute, 10 percent solution, of sodium hydroxide or potassium hydroxide to raise the pH, for example, to a range of from 7 to 9. The resulting acylated lecithin is considered herein to be more water dispersible and more heat stable than the lecithin itself. For example, see U.S. Pat. No. 4,479,977.

Acylated lecithin may be a viscous fluid with a wide range of uses including, for example, use as a wetting agent, emulsifier, release agent and stabilizer for various materials and substrates.

Hydroxylated lecithin may be a water-dispersible fluid that may be used, for example, as an oil-in-water emulsifier and dispersion agent.

De-oiled lecithin may be described as an oil-free, refined, lecithin which might be used, for example, as a release and/or wetting agent.

It has also been observed herein that a butyl rubber composition which contains the aforesaid lecithin material, particularly the acylated lecithin, has an enhanced resistance to failure in dynamic flex tests such as PG flex test ASTM D813 and reduced cut growth of the bladder rubber composition.

It is to be appreciated that it is considered herein, for tire curing bladder purposes, a lubricant dispersion for the butyl rubber composition should desirably bleed to the bladder surface to add interfacial lubricity between the bladder surface and the tire to be shaped and cured.

Accordingly, while castor oil is conventionally used for such purpose, other suitable lubricants are sometimes sought.

Accordingly, it is desired herein to evaluate a lecithin, and particularly a liquid-modified lecithin, for use as an additive to at least partially replace castor oil in a butyl rubber bladder composition and to thereby provide acceptable interfacial lubricity at the bladder's outer surface.

It is believed that the use herein of a lecithin, particularly a liquid-modified lecithin, for a partial or complete replacement of castor oil in a tire cure butyl rubber bladder, is novel and the observed results not readily predictable with certainty without significant experimentation.

Conventional preferred butyl rubbers for use in this invention are typically copolymers of isobutylene and a minor amount of a conjugated diene such as, for example, isoprene. Desirably, the isoprene component is from 1 to 5 weight percent of the butyl rubber with the remainder (e.g. 95–99 weight percent) being derived from the isobutylene.

An alternative butyl rubber for the tire cure bladder, although less preferable, is a copolymer of at least one iso-olefin monomer and at least one para-alkylstyrene monomer which is brominated. The iso-olefin for such brominated butyl rubber may be one or more iso-olefins of 4 to 7 carbon atoms, (e.g.: para-methylstyrene) and may be usually free of isoprene and other conjugated dienes. In practice, the brominated butyl rubber is conventionally brominated after the monomers are polymerized to form the butyl rubber. The brominated butyl rubber conventionally contains from about 0.3 to about 2 weight percent bromination. Such a brominated copolymer is Exxpro™ from Exxon Chemical with a Mooney Viscosity ML (1+8) 125° C. of 50 plus or minus five, a para-methylstyrene content of about 5 weight percent, isobutylene content of 94 or 95 weight percent, and a total bromine content of 0.8 weight percent. A European patent application having Publication No. 0,344,021 describes how to make such polymers.

It is to be appreciated that the butyl rubber composition for the tire curing bladder is resin-cured instead of sulfur-cured which is a conventional practice. The resin curatives are conventionally composed of a small amount of polychloroprene rubber, sometimes referred to as a "chloroprene rubber" and acts as a chlorine source, and a phenol-formaldehyde resin. Such resin cure system for butyl rubber is well known to those having skill in such art.

In practice, the polychloroprene rubber co-curative is conventionally counted toward the 100 parts by weight rubber of the butyl rubber composition even though it has a separate function as a halogen containing elastomer. It may be included in amounts up to 10 or 20 weight percent of the butyl rubber when a halogen source is desirable to activate the resin cure system.

Resins for curing butyl rubber may be used in amounts from 1 to 10 phr and include conventional phenol-formaldehyde resins. Such cure systems for bladder compositions are well known to those having skill in the art. For an example, see U.S. Pat. Nos. 3,031,423 and 5,728,311.

The cured rubber compositions for use in a bladder may also contain conventional additives including fillers, peptizing agents, stearic acid, accelerators, sulfur-vulcanizing agents, resin for curing, antiozonants, antioxidants, processing oils, activators, initiators, plasticizers, waxes, pre-vulcanization inhibitors, extender oils and the like.

Antioxidants and antiozonants may desirably be added to the curing bladder composition. Antioxidants prevent oxidative crosslinking or oxidative chain scission so that the modulus and fracture properties of the rubber are unchanged during exposure to oxidation especially at elevated temperatures. Antioxidants for rubber compounds in general and for butyl rubber more specifically are well known to the art. Antidegradants include antioxidants and antiozonants. Desirable amounts are from 0.1 to 10 phr, and more desirably about 2 to 6 phr. Antiozonants are compounds that prevent chain scission due to exposure to ozone. They are also well known to the art. Antidegradants include monophenols, bisphenols, thiophenols, polyphenols, hydroquinone derivatives, phosphites, phosphate blends, thioesters, naphthylamines, diphenol amines as well as other diaryl amine derivatives, para-phenylenes, diamines, quinolines, and blended amines.

Various fillers are often incorporated into the curing bladder compositions. They may be used, for example, in amounts of about 20 to about 80 phr. A preferred filler is carbon black. Elastomer reinforcing type fillers are preferred for use in curing bladders. Silica may be used in a very minor amount in addition to the carbon black. Silicas are generally described as amorphous silicas, particularly precipitated silicas. Fillers include reinforcing fillers such as carbon black which can be used, for example, in amounts from about 25 to about 75 phr. Typical carbon blacks that can be used include, for example, according to standard ASTM designations, acetylene black (e.g. N990), N110, N121, N220, N231, N234, N242, N293, N299, N326, N330, N332, N339, N343, N347, N351, N358, N375, N472, N539, N550, N683, N754, and N765, although acetylene black and N347 and/or N220 carbon blacks are usually preferred. Preferably a major portion of the carbon black is acetylene black.

Various oils and waxes may be used in curing bladder formulation depending upon the compatibility of the oils and waxes with the butyl rubber and the other components of the rubber formulation. They may be uniformly dispersed or they may desirably tend to phase separate (migrate to the surface) from the composition. Waxes include microcrystalline wax and paraffin wax. Oils include aliphatic-napthenic aromatic resins, polyethylene glycol, petroleum oils, ester plasticizers, vulcanized vegetable oils, phenolic resin, polymeric esters and rosins. Waxes can be used in conventional individual amounts from 1 to 5 or up to 10 phr. They are usually considered plasticizers and modulus modifiers. Fatty acids such as stearic acid, palmitic acid and oleic acid may be used in amounts from 0.1 to 7 phr with a range of about 0.2 to 6 phr sometimes being more preferred. Zinc oxide may be present, for example, in amounts from about 2 to 15 phr.

The curing bladder may be molded in an injection molding machine or a transfer molding machine. If transfer molding is selected, the material from the Banbury is extruded as a slug. A cure rheometer may be used to determine the approximate time to develop optimal cure at specific temperatures. The actual cure time will depend on heating rate and the gauge (thickness) of the curing bladder. The curing bladder desirably will have a toroidal shape. The curing bladder material tested in the examples was cured for 60 minutes at 190° C.

The curing bladders of this invention are useful for molding and curing various hydrocarbon materials including pneumatic vehicle tires and miscellaneous pneumatic tires for non-vehicle applications. Other hydrocarbon articles cured in bladder equipped presses include hoses, various sleeves, and air springs (a shock absorbing spring for commercial vehicles). The curing bladders have good lubricity, desirable release characteristics from cured hydrocarbon rubbers, extended dynamic flex life, and extended use lifetimes due to their enhanced thermal stability.

Typical properties of a curing bladder as produced are desirably a 300 percent Modulus of 4 to 10 MPa, a Breaking Strength of 5 to 14 MPa, an Elongation at Break of 400 to 1,000 percent, a Shore A Hardness of 35 to 85, a Hot Tension Set (ASTM D412) after 16 hours at 50 percent elongation and 190° C. of 5 to 20 percent, and a Hot Peel Adhesion to a butyl rubber innerliner of 40 to 100 N. More desirably, the curing bladder has a 300% Modulus of 4 to 8 MPa, a Breaking Strength of 8 to 11 MPa, an Elongation at Break of 200 to 700, a Shore A Hardness of 40 to 70, a Hot Tension Set of 12 to 17%, and a Hot Peel Adhesion of 45 to 90 Newtons.

The properties of a curing bladder after aging 24 hours at 177° C. desirably include an Elongation at Break of about 200 to about 500%, usually more desirably 250 to about 400%, a 300% Modulus of 4.5 to 7.5 MPa, a Breaking Strength of 4.5 to 7.5 MPa, a Shore A Hardness of about 55 to about 90, a Hot Tension Set of about 8 to about 18% and a Coefficient of Friction (ASTM D4518), without additional lubrication, of about 0.4 to about 5, alternatively about 0.6 to about 4.

The following Table 1 illustrates an expandable, tire curing bladder composition based upon butyl rubber. Sample A is a Control rubber composition and Sample B is a butyl rubber composition which contains the liquid acylated lecithin.

Table 2 also illustrates various physical properties of the Samples A and B.

The amounts of materials specified are parts by weight unless otherwise indicated.

TABLE 1

| Bladder Compound | Sample A (Control) | Sample B |
|---|---|---|
| Butyl 268[1] | 95 | 95 |
| Carbon black[2] | 55 | 55 |
| Castor oil[3] | 6 | |
| Acylated lecithin[4] | | 6.00 |
| Zinc oxide | 5 | 10 |
| Stearic acid | 5.2 | 5.2 |
| Phenolic resin[5] | 9 | 9 |
| Polychloroprene rubbr[6] | 5 | 5 |
| Total | 180.2 | 185.2 |

[1]Butyl rubber obtained as Butyl 268 from the Exxon company as a copolymer of isobutylene and a minor amount of isoprene, having a Mooney ML 1 + 8 @ 125° C. of about 51 ± 5 and containing about 0.5 to 5 percent carbon-to-carbon unsaturation.
[2]Carbon black as a blend of acetylene black and N347 carbon black.
[3]Castor oil obtainable as MOR Castor Oil from the Alnor company.
[4]Liquid acylated lecithin obtained as Centrophase HR from the Central Soya, Inc. company (Ft Wayne, Indiana, USA) as a liquid having a viscosity of about 3,000 cps at 25° C.; a maximum of about 0.8 weight percent moisture content; and acetone insolubles of about 53 to abut 56 percent. It is understood to have been obtained by reacting lecithin hydrate (obtained from soya-bean oil) with acetic anhydride and treated with dilute base such as potassium hydroxide.
[5]Phenol-formaldehyde resin.
[6]Polychloroprene rubber obtained as Neoprene TRT from the DuPont de Nemours Company.

The rubber composition Samples were cured in a suitable mold for about 30 minutes at about 190° C. and various physical properties of the cured butyl rubber are shown in the following Table 2.

TABLE 2

| Properties | Sample A (Control) | Sample B |
|---|---|---|
| 100% Modulus, MPa | 2.18 | 2.01 |
| 300% Modulus, MPa | 6.86 | 5.98 |
| Tensile strength, MPa | 10.45 | 10.06 |
| Elongation @ break (%) | 563 | 594 |

TABLE 2-continued

| Properties | Sample A (Control) | Sample B |
|---|---|---|
| Hardness @ RT - Shore A | 67 | 67 |
| Hardness @ 100° C. - Shore A | 52 | 51 |
| Rebound @ RT | 12 | 13 |
| Rebound @ 100° C. | 45 | 42 |
| Fatigue to failure, kilo cycles | 584 | 687 |
| Hot peel adhesion (expressed in Newtons) of cured butyl rubber to uncured tire innerliner composition | 107 | 60 |
| Kinetic C.O.F.[1] | 3.1 | 2.9 |
| Average tear propagation[2] (cm) | | |
| a) after 120 min | 0.3 | 0.2 |
| b) after 180 min | 1.2 | 0.3 |

[1]The term "C.O.F." refers to coefficient of friction according to ASTM D4518, Method B.
[2]The tear propagation is according to ASTM D813 and is expressed in units of cm of tear.

It is readily seen from Table 2 that the fatigue to failure, or resistance to fatigue, of Sample B which contained the acylated lecithin, substantially increased as compared to the Control Sample A.

This is considered herein to be a significant benefit where a tire cure butyl rubber bladder composition is desired with a predicted longer bladder life.

It is also readily seen from Table 2 that the adhesion value for Sample B is substantially reduced as compared to Control Sample A.

This is considered herein to be a significant benefit where a tire cure butyl rubber bladder composition is desired with a predicted reduced adhesion between the cured butyl rubber of bladder to the uncured tire innerliner.

It is further readily seen from Table 2 that the average tear propagation for Sample B is substantially reduced as compared to Control Sample A.

This is considered herein to be a significant benefit where a tire cure butyl rubber bladder composition is desired with a predicted longer bladder life in service.

Samples A and B were also submitted to accelerated aging by heating to about 190° C. for about 24 hours in a hot air oven.

Various physical properties of the aged Samples are reported in the following Table 3.

TABLE 3

| Aged Properties | Sample A Control | Sample B |
|---|---|---|
| 100% modulus, MPa | 3.47 | 2.75 |
| 300% modulus, MPa | 8.37 | 6.21 |
| Tensile strength, MPa | 7.70 | 5.81 |
| Elongation @ break (%) | 314 | 326 |
| Hardness, Shore A, 23° C., | 82 | 80 |
| Hot tension set (%) | 10 | 11 |
| Hardness, Shore A, 100° C. | 65 | 63 |
| Rebound, 23° C. | 18 | 17 |
| Rebound, 100° C. | 42 | 40 |

It is readily seen from Table 2 and Table 3 that, while the modulus of both Sample A and Sample B were somewhat increased upon aging, the increase in modulus for Sample B was considerably less than that of the Control Sample A.

This is considered herein to be significant as being predictable of an extended service life for a butyl rubber tire curing bladder.

For this Example, the tensile tests on the samples are well known to the art and generate the modulus, break strength, and elongation values. The modulus values were determined by using a ring option for the sample to be tested. The Shore A Hardness test is ASTM D2240. The coefficient of friction test is a measure of the friction between a cured bladder composition and an uncured tire innerliner material. It is expressed herein as a ratio of pulling force divided by the specified load units by ASTM Method D4518 Method B. Desirably the value is below 0.7 so the data indicates a lubricant is needed. Lubricity, as previously mentioned, is necessary for the bladder to slide or move relative to the tire during inflation of the bladder.

For the peel adhesion test, a Mylar™ (polyester) sheet having laterally-placed windows cut therein (5 mm wide by 100 mm longer) is placed between the cured bladder material and an uncured tire innerliner material which is the other substrate. The window in the Mylar™ sheet creates a known area of interfacial adhesion between the bladder sample and the tire innerliner sample. A fabric backing is applied to the bladder material and the butyl innerliner and is secured with an adhesive and/or stitching. The assembled sample of the two substrates with their fabric backing is cured in a diaphragm curing mold for 28 minutes at 150° C. with 100 psi pressure (0.69 MPa) in the diaphragm. After this process, the assembled sample is cut in 1" (2.54 cm) wide strips with the window portion of the Mylar longitudinal and centered therein, the two substrate materials are separated slightly by hand operation. They are then mounted in an Instron™ type force displacement tester in a configuration such that the peel angle between the separated substrates is 180°. The force displacement tester separates the substrates at a rate of 51 mm/min and records the force used. The average force used over the adhered area divided by the sample width is recorded as the adhesion value.

The tire curing bladders described herein are useful in bladder or diaphragm type curing presses to cure hydrocarbon rubber compositions, and preferably pneumatic tires. These presses desirably have one or more molding surfaces besides the diaphragm or bladder. The uncured hydrocarbon composition is placed in the mold, the mold is closed, and the bladder or diaphragm is inflated (expanded usually with a heated gas such as steam). This sandwiches the uncured composition between the bladder or diaphragm and the one or more other mold surfaces. The hydrocarbon rubber typically flows and conforms to the texture and shape of the one or more other mold surfaces which are often a metal or alloy thereof and rather rigidly fixed during the molding operation. Further heating of the uncured composition causes it to cure (also called vulcanization or crosslinking) which solidifies the final shape of the article conforming to the one or more rigid mold surfaces. The bladder or diaphragm is then deflated (removing the internal pressure) to facilitate removal of the molded parts. Depending on the shape of the article, one or more of the other molding surfaces may physically move to open the mold further facilitating part removal.

While in accordance with the patent statutes the best mode and preferred embodiment has been set forth, the scope of the invention is not limited thereto, but rather by the scope of the attached claims.

What is claimed is:

1. An expandable bladder of a butyl rubber composition comprised of a formulated rubber composition which contains about 2 to about 10 parts by weight, per 100 parts by weight rubbery polymers in said rubber composition, of lecithin material dispersed throughout said rubber composition selected from at least one of lecithin, acrylated lecithin, hydroxylated lecithin, de-oiled lecithin, said formulated rubber composition comprising:
(a) butyl rubber as one or more isobutylene rubbery polymers, wherein said isobutylene rubbery polymers are comprised of from about 80 to about 99 weight percent repeat units from isobutylene and from 1 to abut 20 weight percent repeat units from (1) conjugated diene having from 4 to 5 carbon atoms or (2) para-methylstyrene; and
(b) one or more curatives for said rubbery isobutylene polymer(s);
wherein said bladder is of said butyl rubber composition as a cured rubber composition.

2. The bladder of claim 1 where said butyl rubber is a copolymer of isobutylene and isoprene which contains from about 1 to about 5 weight percent units derived from isoprene and where said curatives are polychloroprene rubber and phenol-formaldehyde resin.

3. The bladder of claim 1 wherein said lecithin material is lecithin.

4. The bladder of claim 1 wherein said lecithin material is acylated lecithin.

5. The bladder of claim 1 wherein said lecithin material is an hydroxylated lecithin.

6. The bladder of claim 1 wherein said lecithin material is a de-oiled lecithin.

7. The bladder of claim 2 wherein said lecithin material is an acylated lecithin.

8. The bladder of claim 2 wherein said lecithin material is an acylated lecithin obtained by a reaction of lecithin hydrate with acetic anhydride.

9. The bladder of claim 1 wherein said cured butyl rubber composition also contains from about 2 to about 8 phr of at least one of castor oil, corn oil and soya-bean oil wherein the weight ratio of said oil to said lecithin material is in a range of about 0.5/1 to about 2/1.

10. The bladder of claim 9 wherein said oil is castor oil.

11. The bladder of claim 2 wherein said cured butyl rubber composition also contains from about 2 to about 8 phr of at least one of castor oil, corn oil and soya-bean oil wherein the weight ratio of said oil to said lecithin material is in a range of about 0.5/1 to about 2/1.

12. The bladder of claim 3 wherein said cured butyl rubber composition also contains from about 2 to about 8 phr of at least one of castor oil, corn oil and soya-bean oil wherein the weight ratio of said oil to said lecithin material is in a range of about 0.5/1 to about 2/1.

13. The bladder of claim 4 wherein said cured butyl rubber composition also contains from about 2 to about 8 phr of at least one of castor oil, corn oil and soya-bean oil wherein the weight ratio of said oil to said lecithin material is in a range of about 0.5/1 to about 2/1.

14. The bladder of claim 5 wherein said cured butyl rubber composition also contains from about 2 to about 8 phr of at least one of castor oil, corn oil and soya-bean oil wherein the weight ratio of said oil to said lecithin material is in a range of about 0.5/1 to about 2/1.

15. The bladder of claim 6 wherein said cured butyl rubber composition also contains from about 2 to about 8 phr of at least one of castor oil, corn oil and soya-bean oil wherein the weight ratio of said oil to said lecithin material is in a range of about 0.5/1 to about 2/1.

16. The bladder of claim 7 wherein said cured butyl rubber composition also contains from about 2 to about 8 phr of at least one of castor oil, corn oil and soya-bean oil wherein the weight ratio of said oil to said lecithin material is in a range of about 0.5/1 to about 2/1.

17. The bladder of claim 8 wherein said cured butyl rubber composition also contains from about 2 to about 8 phr of at least one of castor oil, corn oil and soya-bean oil wherein the weight ratio of said oil to said lecithin material is in a range of about 0.5/1 to about 2/1.

18. The bladder of claim 9 wherein said cured butyl rubber composition also contains from about 2 to about 8 phr of at least one of castor oil, corn oil and soya-bean oil wherein the weight ratio of said oil to said lecithin material is in a range of about 0.5/1 to about 2/1.

19. The bladder of claim 1 wherein said butyl rubber composition also contains from 0.5 to about 15 phr of at least one of graphite and polytetrafluoroethylene powder.

20. The bladder of claim 2 wherein said butyl rubber composition also contains from 0.5 to about 15 phr of at least one of graphite and polytetrafluoroethylene powder.

21. The bladder of claim 3 wherein said butyl rubber composition also contains from 0.5 to about 15 phr of at least one of graphite and polytetrafluoroethylene powder.

22. The bladder of claim 4 wherein said butyl rubber composition also contains from 0.5 to about 15 phr of at least one of graphite and polytetrafluoroethylene powder.

23. The bladder of claim 5 wherein said butyl rubber composition also contains from 0.5 to about 15 phr of at least one of graphite and polytetrafluoroethylene powder.

24. The bladder of claim 6 wherein said butyl rubber composition also contains from 0.5 to about 15 phr of at least one of graphite and polytetrafluoroethylene powder.

25. The bladder of claim 7 wherein said butyl rubber composition also contains from 0.5 to about 15 phr of at least one of graphite and polytetrafluoroethylene powder.

26. The bladder of claim 8 wherein said butyl rubber composition also contains from 0.5 to about 15 phr of at least one of graphite and polytetrafluoroethylene powder.

27. The bladder of claim 9 wherein said butyl rubber composition also contains from 0.5 to about 15 phr of at least one of graphite and polytetrafluoroethylene powder.

28. The bladder of claim 10 wherein said butyl rubber composition also contains from 0.5 to about 15 phr of at least one of graphite and polytetrafluoroethylene powder.

29. A tire curing press which contains the expandable butyl rubber bladder of claim 1 to assist in shaping and curing an uncured toroidal pneumatic rubber tire.

30. A tire curing press which contains the expandable butyl rubber bladder of claim 2 to assist in shaping and curing an uncured toroidal pneumatic rubber tire.

31. A tire curing press which contains the expandable butyl rubber bladder of claim 3 to assist in shaping and curing an uncured toroidal pneumatic rubber tire.

32. A tire curing press which contains the expandable butyl rubber bladder of claim 4 to assist in shaping and curing an uncured toroidal pneumatic rubber tire.

33. A tire curing press which contains the expandable butyl rubber bladder of claim 5 to assist in shaping and curing an uncured toroidal pneumatic rubber tire.

34. A tire curing press which contains the expandable butyl rubber bladder of claim 6 to assist in shaping and curing an uncured toroidal pneumatic rubber tire.

35. A tire curing press which contains the expandable butyl rubber bladder of claim 7 to assist in shaping and curing an uncured toroidal pneumatic rubber tire.

36. A tire curing press which contains the expandable butyl rubber bladder of claim 8 to assist in shaping and curing an uncured toroidal pneumatic rubber tire.

37. A tire curing press which contains the expandable butyl rubber bladder of claim 9 to assist in shaping and curing an uncured toroidal pneumatic rubber tire.

38. A tire curing press which contains the expandable butyl rubber bladder of claim 10 to assist in shaping and curing an uncured toroidal pneumatic rubber tire.

39. A tire curing press which contains the expandable butyl rubber bladder of claim 11 to assist in shaping and curing an uncured toroidal pneumatic rubber tire.

40. A tire curing press which contains the expandable butyl rubber bladder of claim 12 to assist in shaping and curing an uncured toroidal pneumatic rubber tire.

41. A tire curing press which contains the expandable butyl rubber bladder of claim 13 to assist in shaping and curing an uncured toroidal pneumatic rubber tire.

42. A tire curing press which contains the expandable butyl rubber bladder of claim 14 to assist in shaping and curing an uncured toroidal pneumatic rubber tire.

43. A tire curing press which contains the expandable butyl rubber bladder of claim 15 to assist in shaping and curing an uncured toroidal pneumatic rubber tire.

44. A tire curing press which contains the expandable butyl rubber bladder of claim 16 to assist in shaping and curing an uncured toroidal pneumatic rubber tire.

45. A tire curing press which contains the expandable butyl rubber bladder of claim 17 to assist in shaping and curing an uncured toroidal pneumatic rubber tire.

46. A tire curing press which contains the expandable butyl rubber bladder of claim 18 to assist in shaping and curing an uncured toroidal pneumatic rubber tire.

47. A tire curing press which contains the expandable butyl rubber bladder of claim 19 to assist in shaping and curing an uncured toroidal pneumatic rubber tire.

48. A tire curing press which contains the expandable butyl rubber bladder of claim 20 to assist in shaping and curing an uncured toroidal pneumatic rubber tire.

49. A tire curing press which contains the expandable butyl rubber bladder of claim 21 to assist in shaping and curing an uncured toroidal pneumatic rubber tire.

50. A tire curing press which contains the expandable butyl rubber bladder of claim 22 to assist in shaping and curing an uncured toroidal pneumatic rubber tire.

51. A tire curing press which contains the expandable butyl rubber bladder of claim 23 to assist in shaping and curing an uncured toroidal pneumatic rubber tire.

52. A tire curing press which contains the expandable butyl rubber bladder of claim 24 to assist in shaping and curing an uncured toroidal pneumatic rubber tire.

53. A tire curing press which contains the expandable butyl rubber bladder of claim 25 to assist in shaping and curing an uncured toroidal pneumatic rubber tire.

54. A tire curing press which contains the expandable butyl rubber bladder of claim 26 to assist in shaping and curing an uncured toroidal pneumatic rubber tire.

55. A method of using an expandable rubber bladder to shape and cure a hydrocarbon rubber, said method comprising:
   a) inserting an uncured rubber composition into a curing mold having an expandable rubber bladder positioned therein and at least one other mold surface,
   b) closing the mold and expanding the bladder by application of heat and fluid in the internal portion of said bladder cavity to expand the bladder outwardly against the inner surface of the uncured hydrocarbon rubber to force said uncured hydrocarbon rubber against the at least one other mold surface,
   c) curing the hydrocarbon rubber under conditions of heat and pressure,
   d) deflating said expandable bladder, and
   e) removing the cured hydrocarbon material from said curing mold,
   the improvement wherein the expandable bladder is the bladder of claim 1.

56. A method of using an expandable rubber bladder to shape and cure a hydrocarbon rubber, said method comprising:
   a) inserting an uncured rubber composition into a curing mold having an expandable rubber bladder positioned therein and at least one other mold surface,
   b) closing the mold and expanding the bladder by application of heat and fluid in the internal portion of said bladder cavity to expand the bladder outwardly against the inner surface of the uncured hydrocarbon rubber to force said uncured hydrocarbon rubber against the at least one other mold surface,
   c) curing the hydrocarbon rubber under conditions of heat and pressure,
   d) deflating said expandable bladder, and
   e) removing the cured hydrocarbon material from said curing mold,
   the improvement wherein the expandable bladder is the bladder of claim 2.

57. A method of using an expandable rubber bladder to shape and cure a hydrocarbon rubber, said method comprising:
   a) inserting an uncured rubber composition into a curing mold having an expandable rubber bladder positioned therein and at least one other mold surface,
   b) closing the mold and expanding the bladder by application of heat and fluid in the internal portion of said bladder cavity to expand the bladder outwardly against the inner surface of the uncured hydrocarbon rubber to force said uncured hydrocarbon rubber against the at least one other mold surface,
   c) curing the hydrocarbon rubber under conditions of heat and pressure,
   d) deflating said expandable bladder, and
   e) removing the cured hydrocarbon material from said curing mold,
   the improvement wherein the expandable bladder is the bladder of claim 3.

58. A method of using an expandable rubber bladder to shape and cure a hydrocarbon rubber, said method comprising:
   a) inserting an uncured rubber composition into a curing mold having an expandable rubber bladder positioned therein and at least one other mold surface,
   b) closing the mold and expanding the bladder by application of heat and fluid in the internal portion of said bladder cavity to expand the bladder outwardly against the inner surface of the uncured hydrocarbon rubber to force said uncured hydrocarbon rubber against the at least one other mold surface,
   c) curing the hydrocarbon rubber under conditions of heat and pressure,
   d) deflating said expandable bladder, and
   e) removing the cured hydrocarbon material from said curing mold,
   the improvement wherein the expandable bladder is the bladder of claim 4.

59. A method of using an expandable rubber bladder to shape and cure a hydrocarbon rubber, said method comprising:
   a) inserting an uncured rubber composition into a curing mold having an expandable rubber bladder positioned therein and at least one other mold surface, b) closing the mold and expanding the bladder by application of heat and fluid in the internal portion of said bladder cavity to expand the bladder outwardly against the inner surface of the uncured hydrocarbon rubber to force said uncured hydrocarbon rubber against the at least one other mold surface, c) curing the hydrocarbon rubber under conditions of heat and pressure, d) deflating said expandable bladder, and e) removing the cured hydrocarbon material from said curing mold, the improvement wherein the expandable bladder is the bladder of claim 7.

60. A method of using an expandable rubber bladder to shape and cure a hydrocarbon rubber, said method comprising:

a) inserting an uncured rubber composition into a curing mold having an expandable rubber bladder positioned therein and at least one other mold surface, b) closing the mold and expanding the bladder by application of heat and fluid in the internal portion of said bladder cavity to expand the bladder outwardly against the inner surface of the uncured hydrocarbon rubber to force said uncured hydrocarbon rubber against the at least one other mold surface, c) curing the hydrocarbon rubber under conditions of heat and pressure, d) deflating said expandable bladder, and e) removing the cured hydrocarbon material from said curing mold, the improvement wherein the expandable bladder is the bladder of claim 9.

61. A method of using an expandable rubber bladder to shape and cure a hydrocarbon rubber, said method comprising:

a) inserting an uncured rubber composition into a curing mold having an expandable rubber bladder positioned therein and at least one other mold surface, b) closing the mold and expanding the bladder by application of heat and fluid in the internal portion of said bladder cavity to expand the bladder outwardly against the inner surface of the uncured hydrocarbon rubber to force said uncured hydrocarbon rubber against the at least one other mold surface, c) curing the hydrocarbon rubber under conditions of heat and pressure, d) deflating said expandable bladder, and e) removing the cured hydrocarbon material from said curing mold, the improvement wherein the expandable bladder is the bladder of claim 10.

62. A method of using an expandable rubber bladder to shape and cure a hydrocarbon rubber, said method comprising:

a) inserting an uncured rubber composition into a curing mold having an expandable rubber bladder positioned therein and at least one other mold surface, b) closing the mold and expanding the bladder by application of heat and fluid in the internal portion of said bladder cavity to expand the bladder outwardly against the inner surface of the uncured hydrocarbon rubber to force said uncured hydrocarbon rubber against the at least one other mold surface, c) curing the hydrocarbon rubber under conditions of heat and pressure, d) deflating said expandable bladder, and e) removing the cured hydrocarbon material from said curing mold, the improvement wherein the expandable bladder is the bladder of claim 11.

63. A method of using an expandable rubber bladder to shape and cure a hydrocarbon rubber, said method comprising:

a) inserting an uncured rubber composition into a curing mold having an expandable rubber bladder positioned therein and at least one other mold surface, b) closing the mold and expanding the bladder by application of heat and fluid in the internal portion of said bladder cavity to expand the bladder outwardly against the inner surface of the uncured hydrocarbon rubber to force said uncured hydrocarbon rubber against the at least one other mold surface, c) curing the hydrocarbon rubber under conditions of heat and pressure, d) deflating said expandable bladder, and e) removing the cured hydrocarbon material from said curing mold, the improvement wherein the expandable bladder is the bladder of claim 12.

64. A method of using an expandable rubber bladder to shape and cure a hydrocarbon rubber, said method comprising:

a) inserting an uncured rubber composition into a curing mold having an expandable rubber bladder positioned therein and at least one other mold surface, b) closing the mold and expanding the bladder by application of heat and fluid in the internal portion of said bladder cavity to expand the bladder outwardly against the inner surface of the uncured hydrocarbon rubber to force said uncured hydrocarbon rubber against the at least one other mold surface, c) curing the hydrocarbon rubber under conditions of heat and pressure, d) deflating said expandable bladder, and e) removing the cured hydrocarbon material from said curing mold, the improvement wherein the expandable bladder is the bladder of claim 13.

65. A method of using an expandable rubber bladder to shape and cure a hydrocarbon rubber, said method comprising:

a) inserting an uncured rubber composition into a curing mold having an expandable rubber bladder positioned therein and at least one other mold surface, b) closing the mold and expanding the bladder by application of heat and fluid in the internal portion of said bladder cavity to expand the bladder outwardly against the inner surface of the uncured hydrocarbon rubber to force said uncured hydrocarbon rubber against the at least one other mold surface, c) curing the hydrocarbon rubber under conditions of heat and pressure, d) deflating said expandable bladder, and e) removing the cured hydrocarbon material from said curing mold, the improvement wherein the expandable bladder is the bladder of claim 14.

66. A method of using an expandable rubber bladder to shape and cure a hydrocarbon rubber, said method comprising:

a) inserting an uncured rubber composition into a curing mold having an expandable rubber bladder positioned therein and at least one other mold surface, b) closing the mold and expanding the bladder by application of heat and fluid in the internal portion of said bladder cavity to expand the bladder outwardly against the inner surface of the uncured hydrocarbon rubber to force said uncured hydrocarbon rubber against the at least one other mold surface, c) curing the hydrocarbon rubber under conditions of heat and pressure, d) deflating said expandable bladder, and e) removing the cured hydrocarbon material from said curing mold, the improvement wherein the expandable bladder is the bladder of claim 15.

67. A method of using an expandable rubber bladder to shape and cure a hydrocarbon rubber, said method comprising:

a) inserting an uncured rubber composition into a curing mold having an expandable rubber bladder positioned therein and at least one other mold surface, b) closing the mold and expanding the bladder by application of heat and fluid in the internal portion of said bladder cavity to expand the bladder outwardly against the inner surface of the uncured hydrocarbon rubber to force said uncured hydrocarbon rubber against the at least one other mold surface, c) curing the hydrocarbon rubber under conditions of heat and pressure, d) deflating said expandable bladder, and e) removing the cured hydrocarbon material from said curing mold, the improvement wherein the expandable bladder is the bladder of claim 16.

68. A method of using an expandable rubber bladder to shape and cure a hydrocarbon rubber, said method comprising:

a) inserting an uncured rubber composition into a curing mold having an expandable rubber bladder positioned therein and at least one other mold surface, b) closing the mold and expanding the bladder by application of heat and fluid in the internal portion of said bladder cavity to expand the bladder outwardly against the inner surface of the uncured hydrocarbon rubber to force said uncured hydrocarbon rubber against the at least one other mold surface, c) curing the hydrocarbon rubber under conditions of heat and pressure, d) deflating said expandable bladder, and e) removing the cured hydrocarbon material from said curing mold, the improvement wherein the expandable bladder is the bladder of claim 17.

69. A method of using an expandable rubber bladder to shape and cure a hydrocarbon rubber, said method comprising:

a) inserting an uncured rubber composition into a curing mold having an expandable rubber bladder positioned therein and at least one other mold surface, b) closing the mold and expanding the bladder by application of heat and fluid in the internal portion of said bladder cavity to expand the bladder outwardly against the inner surface of the uncured hydrocarbon rubber to force said uncured hydrocarbon rubber against the at least one other mold surface, c) curing the hydrocarbon rubber under conditions of heat and pressure, d) deflating said expandable bladder, and e) removing the cured hydrocarbon material from said curing mold, the improvement wherein the expandable bladder is the bladder of claim 18.

70. A method of using an expandable rubber bladder to shape and cure a hydrocarbon rubber, said method comprising:

a) inserting an uncured rubber composition into a curing mold having an expandable rubber bladder positioned therein and at least one other mold surface, b) closing the mold and expanding the bladder by application of heat and fluid in the internal portion of said bladder cavity to expand the bladder outwardly against the inner surface of the uncured hydrocarbon rubber to force said uncured hydrocarbon rubber against the at least one other mold surface, c) curing the hydrocarbon rubber under conditions of heat and pressure, d) deflating said expandable bladder, and e) removing the cured hydrocarbon material from said curing mold, the improvement wherein the expandable bladder is the bladder of claim 19.

* * * * *